United States Patent
Bardine et al.

(10) Patent No.: US 7,241,337 B1
(45) Date of Patent: Jul. 10, 2007

(54) PAVING COMPOSITION CONTAINING LIME KILN DUST

(75) Inventors: Ralph W. Bardine, Hershey, PA (US); Lawrence W. Cole, Cranberry Township, PA (US); James V. Derby, Monaca, PA (US)

(73) Assignee: Carmeuse North America Services, Inc., Pittsburgh, PA (US)

( * ) Notice: Subject to any disclaimer, the term of this patent is extended or adjusted under 35 U.S.C. 154(b) by 0 days.

(21) Appl. No.: 11/495,395

(22) Filed: Jul. 28, 2006

Related U.S. Application Data

(60) Provisional application No. 60/707,594, filed on Aug. 12, 2005.

(51) Int. Cl.
*C09D 195/00* (2006.01)
*C04B 24/36* (2006.01)

(52) U.S. Cl. .......................... 106/284.02; 106/284.04; 106/668

(58) Field of Classification Search ................ 106/668, 106/284.02, 284.04
See application file for complete search history.

(56) References Cited

U.S. PATENT DOCUMENTS

| | | | |
|---|---|---|---|
| 3,977,891 A | 8/1976 | Bertrand | 106/281 |
| 5,507,572 A * | 4/1996 | Shields et al. | 366/6 |
| 6,562,118 B2 | 5/2003 | Hagens | 106/164.5 |
| 6,758,892 B2 | 7/2004 | Muniandy | 106/164.5 |
| 2003/0211313 A1 | 11/2003 | Tasaki | 428/330 |

OTHER PUBLICATIONS

West et al, "Evaluation of a Lime Kiln Dust as a Mineral Filler for Stone Matrix Asphalt" (Jul. 2005).*

* cited by examiner

*Primary Examiner*—David M Brunsman
(74) *Attorney, Agent, or Firm*—Armstrong, Kratz, Quintos, Hanson & Brooks, LLP

(57) ABSTRACT

A stone matrix asphalt for use as a paving composition, containing lime kiln dust as a mineral filler. The lime kiln dust results from production of lime from limestone in a kiln and contains available calcium oxide in an amount of less than forty percent by weight.

5 Claims, 1 Drawing Sheet

PAVING COMPOSITION CONTAINING LIME KILN DUST

This application claims priority of U.S. Provisional Application Ser. No. 60/707,594 filed Aug. 12, 2005.

FIELD OF THE INVENTION

The present invention relates to asphalt paving compositions and more specifically to a stone matrix asphalt (SMA) containing lime kiln dust (LKD) as the mineral filler in such a composition.

BACKGROUND OF THE INVENTION

Stone matrix asphalt (SMA), also known as stone mastic asphalt, is a tough, stable rut-resistant asphalt mixture that relies on stone-to-stone contact to provide strength and a rich mortar binder to provide durability. These objectives are usually achieved with a gap-graded aggregate coupled with fiber or polymer modified, and high asphalt content mixture. The SMA is composed of aggregate(s), mineral filler, asphalt cement and stabilizer. In general, the SMA mixture contains 6%-10% by weight of mineral filler.

Mineral filler is a finely divided mineral matter such as rock dust, slag dust, hydrated lime, hydraulic cement, fly ash, loess, or other suitable mineral matter. Mineral filler is graded within the following limits, per ASTM D 242-95 and AASHTO M17 Standards:

| Sieve | Percent Passing (by mass) |
|---|---|
| 600 μm (No. 30) | 100 |
| 300 μm (No. 50) | 95-100 |
| 75 μm (No. 30) | 70-100 |

While a variety of materials can be used as mineral filler in SMA, fly ash and rock dust are believed to be the most common.

Attempts to use lime kiln dust as a mineral filler in SMA have been made but many have been unsatisfactory and no certainty is available as to how to provide an operative system.

SUMMARY OF THE INVENTION

A stone matrix asphalt is provided for use as a paving composition where the stone matrix asphalt contains a mineral filler that is a lime kiln dust that has an available calcium oxide content of forty percent by weight or less.

DETAILED DESCRIPTION OF THE INVENTION

Figure 1:
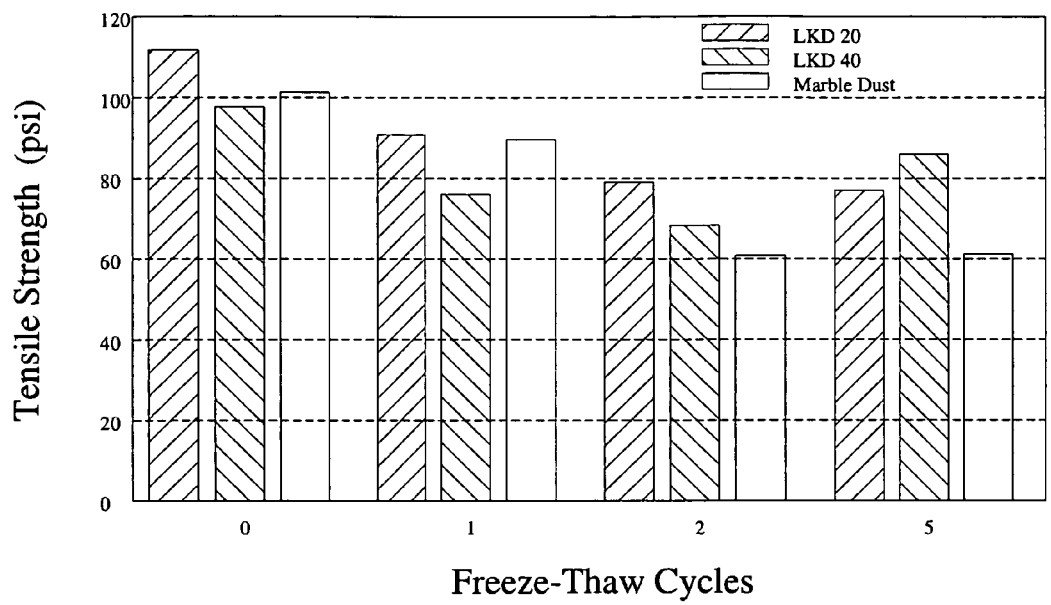
FIG. 1 is a graphical representation of the tensile strength at various freeze-thaw cycles of a marble dust-containing SMA compared with the composition of the present invention.

Stone matrix asphalts are known for use in pavements and generally comprise a mixture of aggregates, such as sand, crushed stone, gravel or slag, asphalt, a stabilizing fiber, such as cellulose, and a mineral filler. Such asphalts are, for example, disclosed in U.S. Pat. No. 6,758,892, the contents of which are incorporated by reference herein.

Lime kiln dust is collected during the calcining of limestone to produce lime. Generally, limestone is calcined in a kiln, such as a rotary kiln, at high temperatures, to convert the limestone to lime (calcium oxide), with the evolution of carbon dioxide. Lime kiln dust is evolved from the kiln and usually collected, such as in a baghouse. The lime kiln dust contains, among other components, free lime, or available calcium oxide, in an amount that will vary dependent upon, among other variables, the starting calcium carbonate material and the operating parameters of the kiln.

According to the present invention a stone matrix asphalt is provided which has a mineral filler that consists of a lime kiln dust that preferably has an available calcium oxide content, by weight, of forty percent or less, more preferably less than about thirty percent and most preferably less than twenty percent. The term "available calcium oxide" as used herein denotes reactive lime as determined by the method described in ASTM C25.28. By use of such a lime kiln dust, an improved moisture sensitivity of the stone matrix asphalt is provided, as are other improved properties.

The benefit of lime to improve the moisture sensitivity characteristics of bituminous pavement is well established. Moisture sensitivity, also called "stripping," is the separation of the asphalt binder from the aggregates in a bituminous pavement. As lime kiln dust contains lime, it may improve the performance of some SMA mixtures prone to stripping as compared to other materials that could be used as mineral filler. These improvements include:

improved asphalt mix stiffness, reducing pavement rutting;

reduced asphalt oxidation and aging; and reduced pavement cracking.

Because lime kiln dust contains lime, it may be superior to other mineral fillers used in SMA in improving these characteristics and properties of SMA mixtures.

EXAMPLE

A comparison test of SMA compositions was made using a lime kiln dust and marble dust as mineral fillers. Lime kiln dust having 20% and 40% available calcium oxide by weight were tested.

Key physical characteristics of the mineral fillers used in the test including gradation, specific gravity, and Rigden Voids were determined. The gradations of the mineral fillers were determined using a Coulter Model LS-200 particle size analyzer. Specific gravities of the mineral fillers were determined using the method described in Section 21 of ASTM C 110-00. The Rigden Voids test was performed on both mineral fillers in accordance with the procedure described in Anderson, D., "Guidelines on the Use of Baghouse Fines," Information Series 101, National Asphalt Pavement Association, February, 1991. Results are shown in Table 1. The lime kiln dust materials having 20% and 40% available calcium oxide are indicated as LKD 20 and LKD 40, respectively.

TABLE 1

Physical Characteristics of the Mineral Fillers

| Characteristic Percent Passing | Lime kiln dust (LKD 20) | Lime kiln dust (LKD 40) | Marble Dust |
| --- | --- | --- | --- |
| 500 μm | 100 | 100 | 100 |
| 300 μm | 100 | 100 | 100 |
| 75 μm | 98 | 97 | 98 |
| 20 μm | 62 | 54 | 60 |
| Specific Gravity | 2.622 | 2.823 | 2.708 |
| Rigden Voids (%) | 45.9 | 48.8 | 37.8 |

The test results show that the particle size distributions for the three mineral fillers are similar. The specific gravity of the Lime Kiln Dust (LKD 20) sample is slightly lower than the marble dust which indicates that for an equivalent mass of mineral filler, the lime kiln dust will occupy a slightly higher volumetric proportion in an SMA mixture. The opposite is true for the Lime Kiln Dust (LKD 40) sample.

The Rigden Voids test evaluates the packing behavior of mineral fillers and provides an indication of the shape of the mineral filler particles. According to National Center for Asphalt Technology's research conducted by Brown, E. R., and Cooley, L. A., "Designing Stone Matrix Asphalt Mixtures", NHCRP 9-8/3, Transportation Research Board, 1998, Rigden Voids is a good indicator of how much the filler will stiffen the asphalt binder. The recommendation from this work was that fillers with Rigden Voids above 50 may cause the mortar to be excessively stiff and difficult to work. Although the Rigden Voids test results for both the lime kiln dust mineral fillers were higher than the result for the marble dust, the values for both the lime kiln dust samples are below the recommended upper limit. The expected stiffening effect of the higher Rigden Void test results for the lime kiln dust samples were not apparent in the mix design properties.

Chemical analysis of the lime kiln dust is shown in Table 2, (% by weight).

TABLE 2

Chemical Properties of the Lime Kiln Dust

| Chemical | Reported as | LKD 20 | LKD 40 |
| --- | --- | --- | --- |
| Total Calcium | Total CaO | 46.3% | 62.15% |
| Available Free Lime | Available CaO | 19.9% | 40.25% |
| Magnesium | MgO | 1.46% | 2.13% |
| Silica | SiO2 | 12.5% | 4.64% |
| Alumina | Al2O3 | 6.86% | 2.19% |
| Iron | Fe2O3 | 2.62% | 0.68% |
| Sulfur | S | 2.0% | 1.92% |
| Loss On Ignition | LOI @ 1000° C. | 12.4% | 19.77% |
| Carbon (typical) | CO2 | 9.4% | 5.33% |

The SMA component materials selected included a standard set of materials used by NCAT in several other SMA research studies. Information on the materials is provided in Table 3. The asphalt binder used in the study was a PG 67-22. Most agencies would normally specify a higher PG grade, such as a PG 76-22 instead of the PG 67-22 for highway construction projects. However, the PG 67-22 was intentionally selected because it was believed that the softer asphalt grade would accentuate the effects the mineral fillers in the subsequent moisture susceptibility tests.

TABLE 3

Materials Used in the SMA Mix Designs (% by weight)

| Material | Type | Source | Percent |
| --- | --- | --- | --- |
| Aggregates | Granite (LA abrasion = 36%) | Vulcan Materials Co., Columbus Quarry | 93.0% |
| Mineral Fillers | A. Rock Dust (Marble Dust) | Georgia Marble Co. | 7.0% |
|  | B. Lime Kiln Dust (20% and 40% available calcium oxide) | Carmeuse Natural Chemicals | 7.0% |
| Asphalt | PG 67-22 | Ergon | * |
| Stabilizing Fiber | Cellulose | Interfibe | 0.3% |

* determined by the mix design procedure

Mix designs were completed in accordance with PP 41-01 (2003), "Designing Stone Matrix Asphalt (SMA)", AASHTO Provisional Standards, June 2004 Edition, American Association of State Highway and Transportation Officials, June 2004. Samples were compacted in a Superpave Gyratory Compactor to 75 gyrations. The mix design properties are shown in Table 4.

TABLE 4

Mix Design Results (% by weight)

| Property | SMA Criteria[1] | LKD 20 SMA | LKD 40 SMA | Marble Dust SMA |
| --- | --- | --- | --- | --- |
| Gradation (% Passing) | | | | |
| 12.5 mm | 90-100 | 96 | 96 | 96 |
| 9.5 mm | 26-78 | 36 | 36 | 36 |
| 4.75 mm | 20-28 | 24 | 24 | 24 |
| 2.36 mm | 16-24 | 22 | 22 | 22 |
| 1.18 mm | 13-21 | 19 | 19 | 19 |
| 0.60 mm | 12-18 | 16 | 16 | 16 |
| 0.30 mm | 12-15 | 14 | 14 | 14 |
| 0.15 mm |  | 12 | 12 | 12 |
| 0.075 mm | 8.0-11.0 | 9.2 | 9.2 | 9.2 |
| Optimum Asphalt Content | 6.0% min. | 6.4% | 6.0% | 6.6% |
| Air Void Content | 4.0% | 4.0% | 4.0% | 4.0% |
| VMA | 17.0% min. | 17.1% | 17.0% | 17.0% |
| $VCA_{mix}$ | $<VCA_{DRC}$ (40.1) | 32.6 | 29.4 | 32.4 |

[1]Based on NCHRP 9-8 recommendations, some criteria differ from AASHTO MP-8

The optimum asphalt content for SMA mixtures, according to AASHTO PP 41, is based on an air void content of 4.0%. To achieve 4.0% air voids, the optimum asphalt content for the lime kiln dust (LKD 20) SMA mix was 6.4%, the optimum asphalt content for the Lime Kiln Dust (LKD 40) SMA mix was 6.0% and the optimum asphalt content for the marble dust SMA mix was 6.6%. All of the mixtures met the mix design requirements for SMA, Brown, E. R. and Cooley, L. A., "Designing Stone Matrix Asphalt Mixtures for Rut Resistant Pavements", NHCRP Report 425, Transportation Research Board, 1999. Based on the mix design results, both the lime kiln dust samples seem to behave very similar to the marble dust mineral filler.

For the remaining mixture tests, the SMA samples were prepared at the same asphalt content (6.5%) for all three mixtures. With asphalt contents of 6.5%, all three mixes still met the SMA mix design criteria except for the slight change in air void contents.

The first test conducted on the mixtures was a test to check for the potential of the binder in an SMA to settle or drain within the loose mixture during short term storage or transportation during construction. Problems with excessive draindown are normally associated with inadequate stabilizing fiber content or dispersion. Draindown can also be affected by the mineral fillers stiffening effect on the matrix. Properties of the mixtures at 6.5% asphalt content and the results of the draindown are shown in Table 5. As expected for these mixtures, the percentage of binder draindown was well below the acceptable limit.

TABLE 5

Results of the SMA Mixtures at the Same Asphalt Content, Draindown Results (% by weight)

| Property | Criteria | LKD-20 SMA | Marble Dust SMA |
|---|---|---|---|
| Asphalt Content | — | 6.5% | 6.5% |
| Air Voids @ Ndes | — | 3.9% | 4.3% |
| Binder Draindown | 0.3% max. | 0.01% @ 300° F. | 0.03% @ 300° F. |
| | | 0.00% @ 327° F. | 0.01% @ 327° F. |

A series of tests was performed to assess the potential for moisture damage and/or reactions of CaO with water for the SMA mixtures. A mixture utilizing lime kiln dust having 54% by weight available calcium oxide (LKD54) was also included in the tests. The first series of tests utilized the industry's most commonly specified moisture damage test, AASHTO T283. This test is also referred to as the modified Lottman test or the TSR (tensile strength ratio) test. In summary, T283 consists of preparing a set of mixture samples to an air void content range typical of new construction. The set is divided into two sub-sets: one subset is subjected to saturation by water, a freeze-thaw cycle and then soaked in a 60° C. (140° F.) water bath; the second sub-set is left unconditioned. Tensile strength of both sets is then determined and the ratio of the average conditioned tensile strength to the average unconditioned tensile strength is determined and referred to as the tensile strength ratio (TSR).

TABLE 6

Results of Moisture Damage Susceptibility Tests Using AASHTO T283

| Property | Criteria | Lime Kiln Dust (LKD 20) SMA | Lime Kiln Dust (LKD 40) SMA | Lime Kiln Dust (LKD 54) SMA | Marble Dust SMA |
|---|---|---|---|---|---|
| Avg. Air Voids % | 6 ± 1.0 | 5.9 | 6.1 | 6.2 | 5.9 |
| Avg. Saturation % | 70-80 | 77 | 74 | 78 | 73 |
| Avg. Conditioned Strength, psi | — | 92 | 77 | 99 | 90 |
| Avg. Uncond. Strength, psi | — | 113 | 98 | 25 | 104 |
| Tensile Strength Ratio | 0.70 min. | 0.81 | 0.79 | 0.25 | 0.87 |

The results of the standard AASHTO T 283 test indicate that there are no problems with moisture susceptibility of the test mixtures for all of the samples except the (LKD 54) SMA sample.

Unconditioned tensile strengths of the SMA mixtures with each of the mineral fillers were similar. Conditioned strengths were similar for the marble dust and LKD 20, but dropped some for LKD 40 and dropped significantly for LKD 54. Tensile Strength Ratio (TSR) results were good for all of the mixtures except the mix with LKD 54. The poor TSR result corroborates the poor performance of this mineral filler found in the field. The very high available lime content (54%) for this LKD is believed to vigorously react with water when the SMA is saturated, giving off heat of hydration and damaging the SMA's integrity.

Additional moisture damage susceptibility tests were performed with harsher conditioning procedures. Conditioning and testing of these specimens followed the procedure in AASHTO T 283 except that one set of specimens was subjected to two freeze-thaw cycles and another set was subjected five freeze-thaw cycles before the conditioned tensile strengths were determined. The conditioned strengths for the specimens subjected to additional freeze-thaw cycles are illustrated in FIG. 1.

Other sets of tensile strength reduction specimens were subjected to one freeze-thaw cycle, but the hot water soak period was extended for 48 and 96 hours. These results, shown in Table 7, indicate that extending the soak time reduces the tensile strengths for each of the SMA mixtures. The LDK 20 and marble dust mixtures performed similarly with tensile strengths appearing to stabilize between 48 and 96 hours of soaking at 60° C. The tensile strengths of the LKD 40 samples were some lower, but this difference is not significant considering the variability of the data.

TABLE 7

Effect of Extended Soak Time on Conditioned Tensile Strength

| Hot Water (60° C.) Soak Time, Hrs. | Conditioned Strengths, psi | | |
|---|---|---|---|
| | Marble Dust Average | LKD 20 Average | LKD 40 Average |
| 24 | 89.8 | 92.0 | 76.8 |
| 48 | 64.2 | 75.42 | 67.6 |
| 96 | 67.3 | 66.3 | 49.6 |

Figure 2:
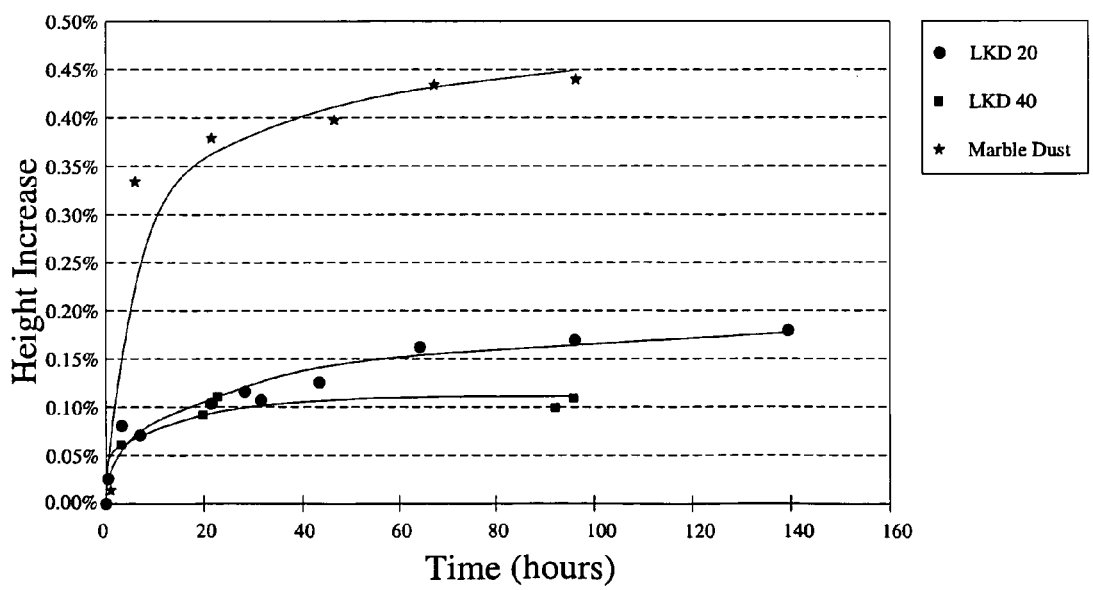
FIG. 2 is a graphical representation of swell tests comparing a marble dust-containing SMA with the composition of the present invention.

Samples of the SMA mixtures with lime kiln dust and marble dust were also prepared and tested to evaluate the potential for expansion due to reaction of free lime in the mineral filler with water. Samples were compacted in the Superpave Gyratory Compactor in the same manner as for T283. This yielded 150 mm diameter specimens with approximately 6% air voids and 95 mm in height. Three specimens were prepared and tested for each mixture. The specimens were then placed in California Bearing Ratio (CBR) molds and the molds were submerged in 25° C.

water. No surcharge weights were placed on the top of the SMA samples allowing free expansion of the samples in the vertical direction. Periodic measurements were made of the specimen heights using the CBR swell apparatus. Results of the swell tests are illustrated in FIG. 2.

The swell test results show that most of the volume change occurs in the first day. The figure also shows that the expansion of the lime kiln dust SMA mixtures was less than half of that for the marble dust SMA. This indicates that the small amount of available free lime in the lime kiln dust mineral filler is not detrimental to the mixture.

While specific materials, and compositional values have been set forth for purposes of describing embodiments of the invention, various modifications can be resorted to, in light of the above teachings, without departing from applicants' novel contribution; therefore in determining the scope of the present invention, reference shall be made to the appended claims.

We claim:

1. In a stone matrix asphalt for use as a paving composition, containing a mineral filler, the improvement wherein said mineral filler is a lime kiln dust resulting from production of lime from limestone, the lime kiln dust contains available calcium oxide in an amount of less than forty percent by weight, and meets ASTM D242 and AASHTO M17 Standard Specification for Mineral Filler for Bituminous Paving Mixtures.

2. The stone matrix asphalt as defined in claim 1 wherein the lime kiln dust contains available calcium oxide in an amount of less than about thirty percent by weight.

3. The stone matrix asphalt as defined in claim 1 wherein the lime kiln dust contains available calcium oxide in an amount of less than about twenty percent by weight.

4. The stone matrix asphalt as defined in claim 1, wherein physical characteristics of said lime kiln dust are such that said lime kiln dust has a Rigden Voids Value of less than 50 percent.

5. In a stone matrix asphalt for use as a paving composition, containing mineral filler, the improvement, wherein said mineral filler is a lime kiln dust resulting from production of lime from limestone, and the lime kiln dust contains available calcium oxide in an amount of less than forty percent by weight, and said lime kiln dust has a Rigden Voids Value of less than 50 percent.

\* \* \* \* \*